James Wismer Holland
INVENTOR.

Jan. 19, 1954
J. W. HOLLAND
2,666,602
AIRCRAFT WING MOUNTING ASSEMBLY
Filed Jan. 4, 1951
4 Sheets-Sheet 2
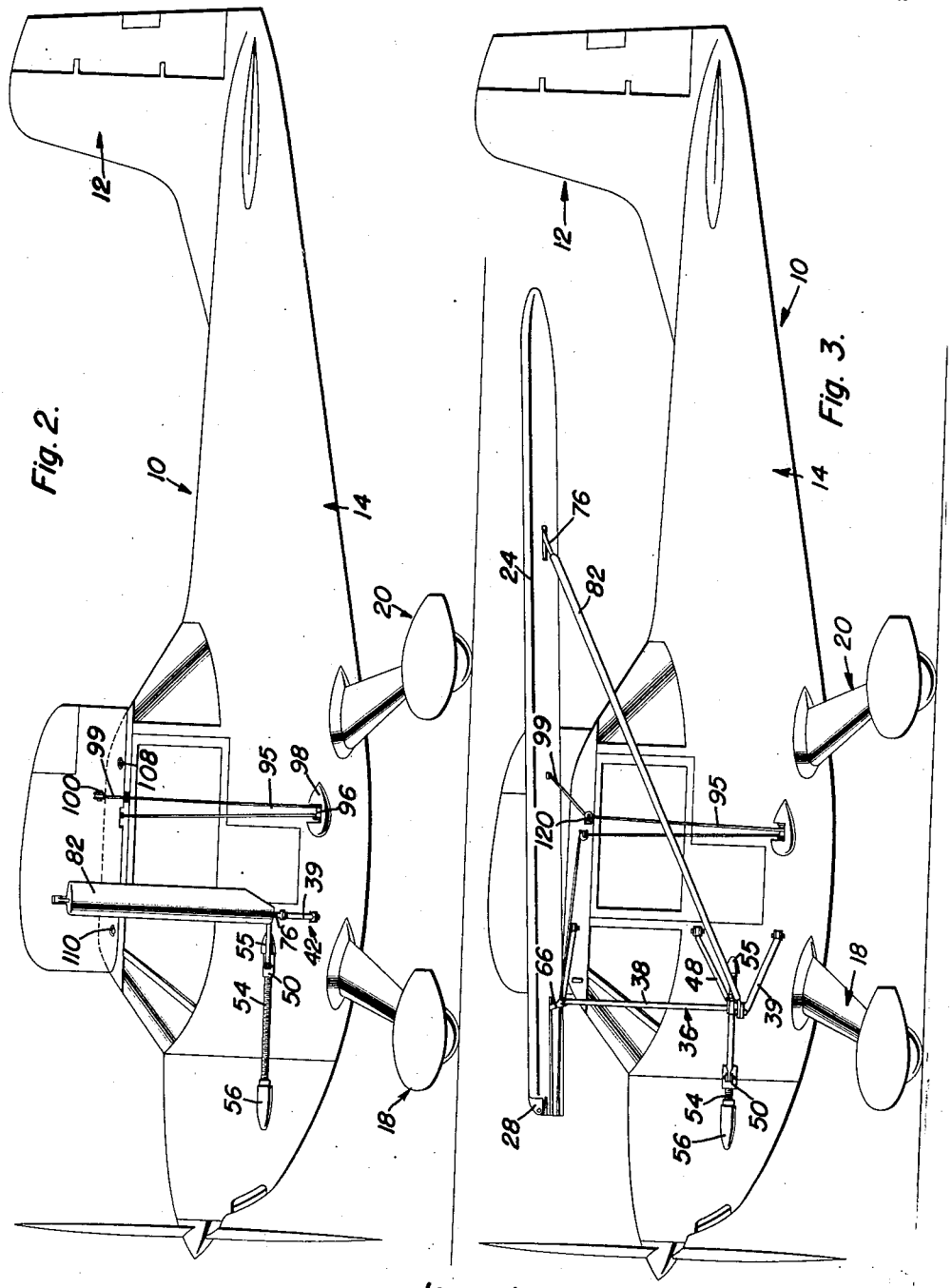
James Wismer Holland INVENTOR.
BY Jan. 19, 1954   J. W. HOLLAND   2,666,602
AIRCRAFT WING MOUNTING ASSEMBLY
Filed Jan. 4, 1951
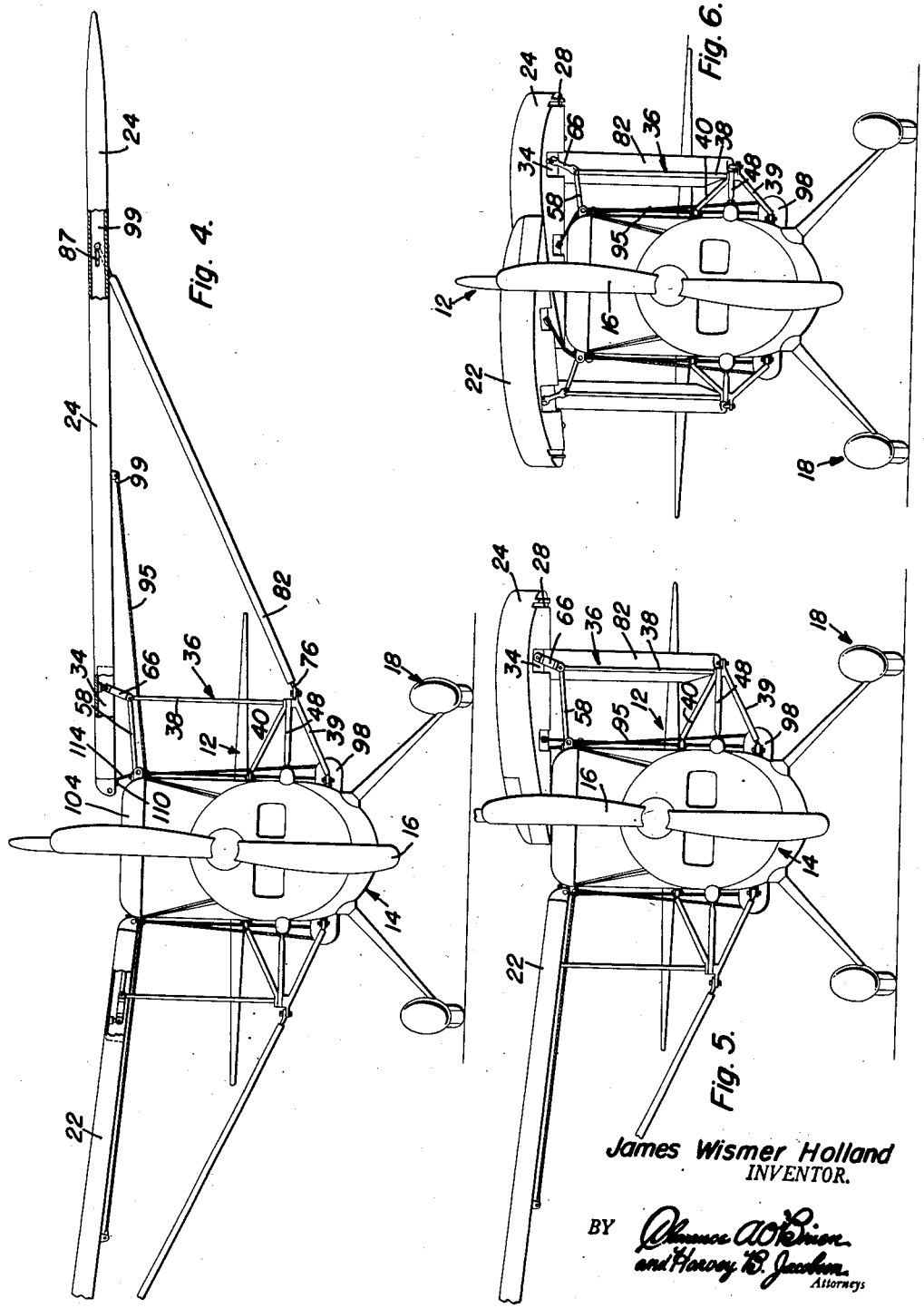
James Wismer Holland
INVENTOR.

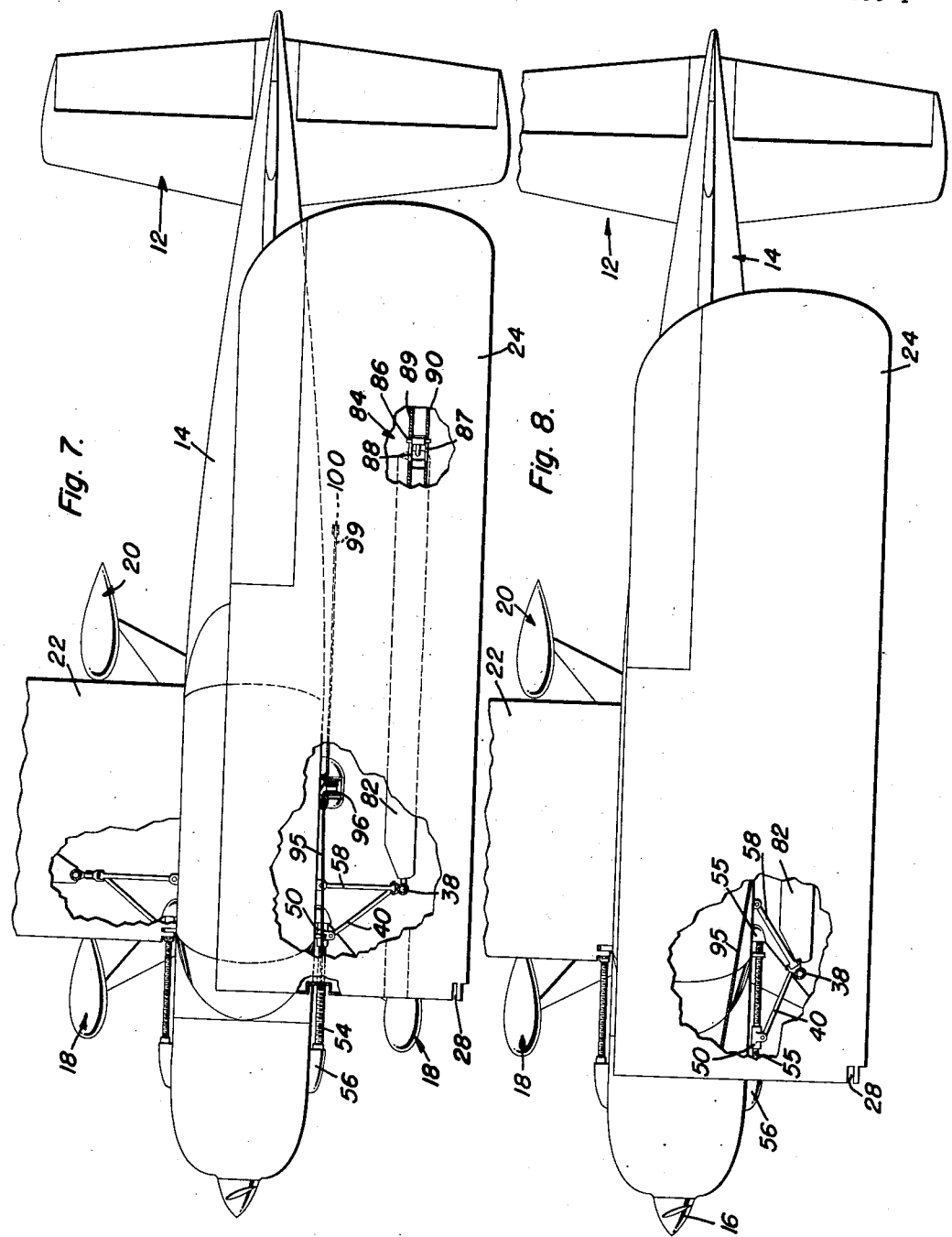

Patented Jan. 19, 1954

2,666,602

UNITED STATES PATENT OFFICE 2,666,602

AIRCRAFT WING MOUNTING ASSEMBLY

James Wismer Holland, Valdosta, Ga.

Application January 4, 1951, Serial No. 204,312

7 Claims. (Cl. 244—49)

This invention relates to improvements in aircraft of the heavier-than-air type.

An object of this invention is to provide an aircraft fuselage with wing sections, both of which have a pivoted frame carried by the fuselage and connected thereto by means of another pivotal connection and a means of pulling the wing, the pulling means being so related to the frame that when the wing is pulled inwardly of the fuselage the wing is elevated a slight amount so that the bottom is raised above the top part of the fuselage and then, the wing section is swung rearwardly to a position of substantial parallelism with the fuselage.

A further object of this invention is to provide a means of swinging the frame toward the fuselage so that the wing section is moved inboard of the fuselage after it has been swung to a position of parallelism or substantial parallelism with the fuselage.

A further object of this invention is to provide a single means or assembly for moving the wing section parallel to the fuselage and for returning the wing section to its normal operating position which is almost perpendicular to the fuselage.

Ancillary objects and features of importance will become apparent in following the description of the illustrated form of the invention.

In the drawings:

Figure 2 is a side view of the construction in Figure 1;

Figure 3 is a side view of the structure of Figure 2 but showing the wing in a position substantial parallel to the fuselage of the aircraft;

Figure 4 is a front view of the device showing the port wing disengaged at the root end thereof and raised up and over the top part of the fuselage;

Figure 5 is a front view of the device in Figure 1 and showing the next step in the operation of folding the wings and that is to swing the port wing rearwardly so that it assumes a position substantially parallel to the longitudinal axis of the fuselage;

Figure 6 is a front view of the aircraft showing the other wing section pulled toward the fuselage and substantially parallel to the longitudinal axis of the fuselage, in this illustration there is the further disclosure of the frames having been pivoted slightly toward the fuselage for the purpose of shifting the wing sections further toward the longitudinal axis of the fuselage;

Figure 7 is a fragmentary plan view of the structure and positions of structure of Figure 5, with portions being broken away to illustrate internal detail; and, Figure 8 is a fragmentary plan view of the device as shown in Figure 3, with parts being broken away in section to illustrate internal detail.

Figure 1:
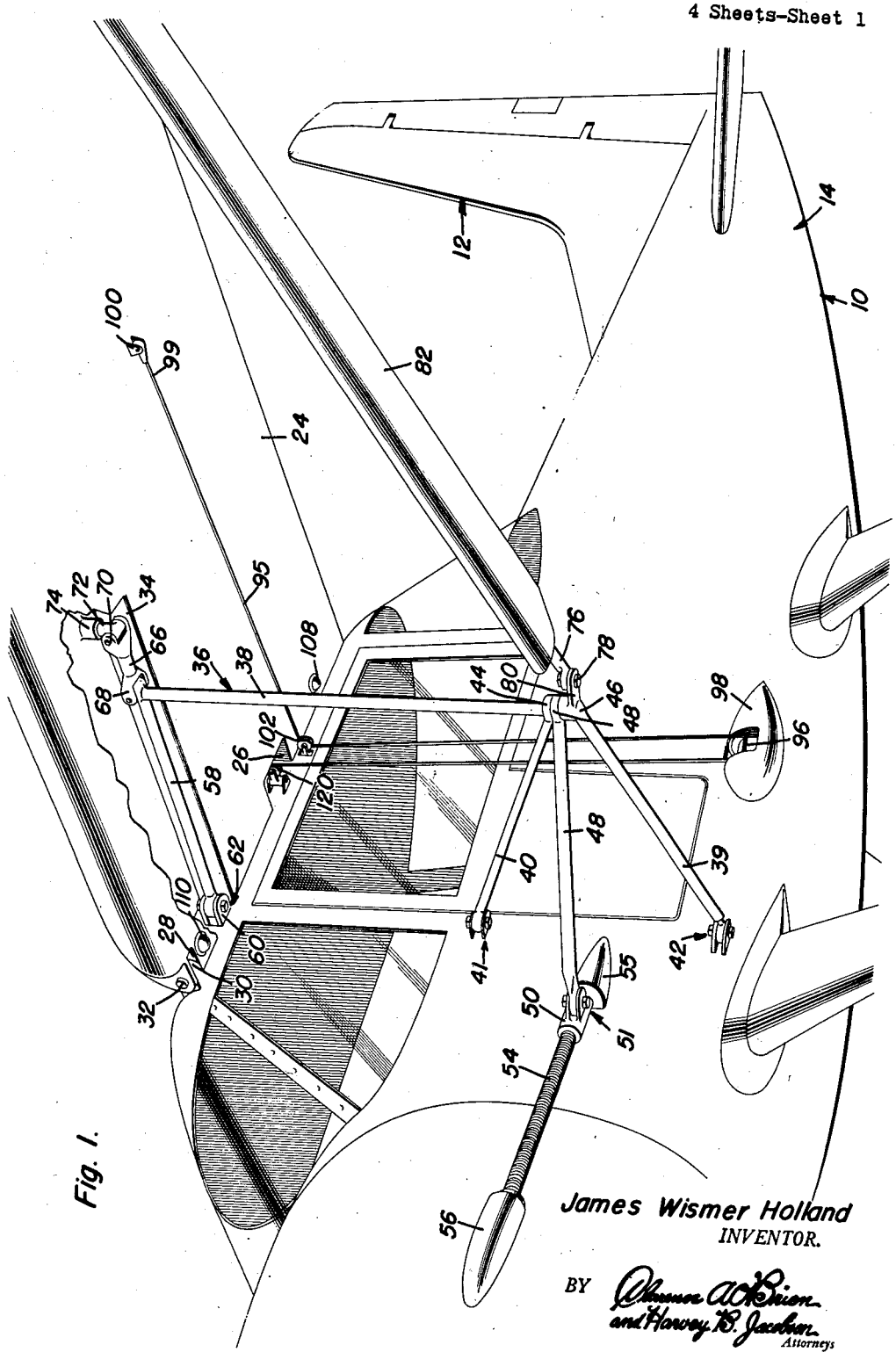
Figure 1 is a fragmentary perspective view of an aircraft which has the improved means of operating the wing sections thereon.

For various reasons such as storage, use on an aircraft carrier, to convert from an air vehicle to a land vehicle, it is of importance to swing the wing sections in a "folded" condition with respect to the fuselage of the aircraft. The illustrated embodiment of the invention, to my knowledge, is a new structure for displacing the wings on the fuselage of the aircraft without entirely separating them from the fuselage.

As shown in the drawing there is an aircraft 10 which includes an empennage 12 together with a fuselage 14, propeller 16 and other standard components. Inasmuch as the wing folding or displacing mechanism is described in connection with an aircraft which can be converted from an air device to a land device, I have illustrated pair 18 of front wheel assemblies and a pair 20 of rear wheel assemblies, both assemblies being secured suitably to the fuselage 14.

There is a pair of wing sections 22 and 24 respectively which are attached to the fuselage and are used for the standard purpose of providing lift for the aircraft. Each wing section is provided with a means for swinging it to the position disclosed in Figure 5 and for returning it to the position disclosed in Figure 1. It is in the particular means for mounting the wing sections on the fuselage and for so moving them that I believe my improvement resides, inasmuch as the referred to means for the wing section 22 is identical to the means for the wing section 24, I will describe in detail only the structure of one wing section and its attachment to the fuselage.

Attention is first invited to Figure 1. The wing section 24 is provided with a notch 26 at its root end to constitute a cable passage and is provided with a slot 28 also at the root end into which the eye member 30 is adapted to pass. This eye member is fixed to the fuselage 14 near the top thereof and is provided with an aperture, as is the portion of the root end of the wing on each side thereof. The apertures are adapted to accommodate releasably the pin 32 which constitutes a fastening means for releasably holding the root end of the wing section 24 fastened to the fuselage.

A downwardly opening slot 34 which is formed in the lower camber member of the wing section 24 is arranged to accommodate certain structure which constitutes a part of a frame generally indicated at 36.

The frame 36 includes a vertical rod 38 which is provided at its lower end with a mounting arm 39 and a mounting arm 40, each of the arms being mounted for pivotal movement on the side of the fuselage by means of bracket assemblies 41 and 42. The mounting arms 39 and 40 converge as they approach the rod 38 and are provided with bearings 44 and 46, the bearing 44 being of the circular type with the rod 38 passed therethrough and the bearing 46 being of the closed type, constituting a seat for the lower end of the rod 38.

An operating link 48 is pivoted by means of a bearing 49 at its outer end to the rod 38, the bearing 39 being located between the bearings 44 and 46. At the opposite end of the operating link 48 there is a traveler 50 connected to said opposite end by means of a pivotal connection 51, and located on a screw 54 which has its ends carried in bearings in 55 and 56. The screw is adapted to be rotated by standard means (unshown) in order to cause the traveler 50 to move from one end to the other on the screw thereby swinging the rod 38 toward or away from the fuselage.

The upper end of the rod 38 has a second rod 58 fixed to it and which constitutes a lateral extension. The outer end of the second rod 58 is secured to a bracket 60, mounted on the side of the fuselage, by means of a standard pivot pin assembly 62. The axis of the pivot pin assembly 62 about which the rod 58 rotates is in the same line as the pivot axes of the pivot connections 41 and 42. Accordingly, when the screw 54 is operated the frame 36 is capable of swinging toward or away from the fuselage, moving with it the extension or rod 58.

There is a link 66 which is pivoted by means of a bifurcated bracket 68 and pin to the rods 58 and 38 at their junction and which is pivoted by a similar bifurcated connection to the lower end of a pivot pin 72. The pivot pin 72 constitutes an axis of rotation for the wing section 24 when the wing section 24 is swung to a position of substantial parallelism to the fuselage 14.

The pivotal assembly 62, the rod 58, link 66, bracket 70 and pin 72 are all located in the downwardly opening slot 34 of the wing section 24, and there is a bearing 74 secured to the structure of the wing section 24 which accommodates the upper end of the pin 72 thereby mounting the wing section 24 in such manner that it is capable of swinging about the pin 72 as an axis of rotation.

A strut 76 is pivoted by means of the pin 78 to a plate 80, extending from the bearing 46. This strut may be provided with faring 82 for the usual purpose. The upper end of the strut 76 is connected to the wing section by means of a sliding connection generally indicated at 84 (Figure 7). This sliding connection consists of a pin 86 which is located in aligned slots 87 and 88 which are formed in structural members 89 and 90 of the wing section 24. The purpose of the slots 87 and 88 is to permit the wing section 24 to shift slightly with respect to the frame 36 when the wing section is being adjusted to the position as disclosed in Figure 3. If necessary, the shape of the slots 87 and 88 may be modified slightly to allow proper movement of the wing section as it is elevated slightly prior to being rotated about the axis of the pin 72.

There is a means provided to be used in connection with the frame 36 for lifting the wing as disclosed in Figure 4 and swinging it rearwardly as disclosed in Figure 5. This means includes a flexible cable 95 which is wound intermediate its ends around a drum 96, carried by the fuselage and located in a fared casing 98. The specific purpose of having the cable 95 connected to the drum intermediate its ends is to allow the use of both of the ends of the cable as a pulling medium. The end 99 of the cable 95 is connected by means of a standard bracket 100 to the lower camber portion of the wing section 24. The bracket 100 is disposed between the bearing 74 and the wing tip and closer to the trailing edge of the wing section 24 than the bearing 74. Accordingly, when the drum 96 is operated by standard unshown means, the cable 95 is pulled, as guided by the guide pulley 102 which is carried by the fuselage. However, prior to the operation of the drum 96, the pin 32 is separated from its apertures thereby freeing the root end of the wing from the fuselage. If found desirable or necessary, two or more pins 32 may be used and located in places where it is found engineeringly expedient and proper. By an application of force by the end 99 of the cable 95 upon rotation of the drum 96 in such direction that the end 99 is pulled toward the drum, the wing section 24 is pulled inboard or inwardly of the fuselage 14 causing the root end of the wing to be lifted above the top surface 104 of the fuselage. Inasmuch as the link 66 is pivoted at both ends, one end to the frame rods 38 and 50 and the other end to the pivot pin 72, the wing section 24 will be elevated to a position above the top surface 104 (Figure 4).

Upon further pulling force on the end 99 of the cable 95 the wing section 24 will be swung rearwardly to a position of substantial parallelism with the longitudinal axis of the fuselage inasmuch as the bracket 100 is attached at the bottom of the wing and at the specific location described previously. At this time the part of the wing section 24 near the trailing edge will be disposed on the upper surface 104 of the fuselage. Therefore in order to reduce sliding friction between the top surface of the fuselage 104 and the lower camber member of the wing section 24, rollers 108 and 110 which may be resilient or metallic roll upon the top surface of the fuselage.

While the end 99 of the cable 95 is being paid in from the drum 96, the end 114 of the cable which is attached to the root end of the wing and toward the trailing edge in notch 26 (note Figures 3, 5 and 6) thereof, is paid out. Hence, as the wing section 24 is swung upwardly (Figure 4) and rearwardly (Figure 8) the end of the cable 114 is supplied with sufficient play as to be capable of moving with the root end of the wing which assumes the position shown in Figure 3.

At this time, that is, when the wing 24 is swung to a position of substantial parallelism with the longitudinal axis of the fuselage, the frame 36 is moved inwardly or inboard of the fuselage to the position disclosed in Figure 6. To do this the screw 54 is rotated, causing the traveler 50 to move forwardly thereof thereby pulling the mounting arms 40, 39 and the rod 58 inwardly toward the fuselage. Inasmuch as the pivot pin 72 is never separated from its bearing 74, the entire wing section 24 is shifted toward the center of the fuselage (Figure 6).

After this operation has been completed in connection with the wing section 24, the identical operation takes place in connection with the wing section 22. However, the anti-friction means equivalent to and identical to those illustrated at 108 and 110 ride upon the upper camber member of the wing section 24 rather than the top surface of the fuselage. Since the top section of the fuselage will be slightly higher than the wing section 24 resting upon it, the length of the link which is directly equivalent to the link 66 is increased and the slot assembly equivalent to the slots 87 and 88 are shaped slightly different from the shapes of the slots 87 and 88 to permit the wing section 22 to be elevated to a location above the wing section 24. Where the mechanical movements are not graphically precisely correct, a slight amount of lost motion in the several pivotal connections will allow proper movements. When the wing sections 22 and 24 are disposed upon the fuselage as noted in Figure 6 and it is desired to use the device as an air vehicle, the wing section 22 is first moved to the position for normal flight, that is, almost perpendicular to the fuselage 14 (dihedral, sweep back, etc. being ignored) and then the wing section 24 is moved to its proper position. To accomplish this return movement, the drum 96 is operated in the direction opposite from that direction of rotation causing the wing section 24 to be moved to the position of parallelism with the fuselage. Accordingly, the end 99 of the cable is paid out while the end 114 of the cable is paid in with respect to the drum 96. Upon movement of the drum in the proper direction the end 114 of the cable 95 is moved outwardly of the fuselage as the cable 95 is guided by the guide pulley 120, carried by the fuselage. This causes the wing section 24 to be rotated about the pivot pin 72 as a vertical axis so that it extends outwardly from the fuselage as disclosed in Figure 4. Prior to this operation, however, the screw 54 is rotated causing the frame 36 to swing outwardly and away from the fuselage 14.

After the wing section 24 assumes the position disclosed in Figure 4, further pulling movement on the end of the cable 114 causes the root end of the wing to swing downwardly so that the bracket 30 fits in the slot 28 and the link 66 is moved to a position substantially parallel to the rod 58. Then the pin 32 is replaced and the drum 96 locked. At this time the aircraft is in readiness for flight.

Having described the invention, what is claimed as new is:

1. In an aircraft having a fuselage, a wing section detachably connected at its inboard end to said fuselage, a frame rotatively connected to said fuselage for movement about a substantially vertical axis, a link having an inner end pivotally connected to said frame, a pivot pin pivotally mounted at the outer end of said link and fixedly attached to said wing section near its inboard end for movement of said link in a substantially vertical plane, pulling means operably attached to said fuselage and connected to said wing section at a point between said pivot pin and the trailing edge of said wing section nearer to the wing tip than said pivot pin for pulling said wing section inwardly toward and above said fuselage and for swinging said wing section to a position substantially parallel to said fuselage and means attached to said fuselage and operatively connected to and rotating said frame toward said fuselage after said wing section has been moved to the position substantially parallel to the fuselage.

2. In an aircraft having a fuselage, a wing section detachably connected at its inboard end to said fuselage, a frame connected to said fuselage, a link having an inner end pivotally connected to said frame, a pivot pin pivotally mounted at the outer end of said link and having means on said wing section rotatably securing the pivot pin thereto for movement of the link in a vertical plane and swinging movement of the wing about the pivot pin in a substantially horizontal plane, pulling means operably attached to said fuselage and connected to said wing section at a point between said pivot pin and the trailing edge of said wing section nearer the wing tip than said pivot pin for pulling said wing section inwardly toward and above said fuselage and for swinging said wing section about said pivot pin to a position substantially parallel to said fuselage.

3. In an aircraft having a fuselage, a wing section detachably connected at its inboard end to said fuselage, a frame connected to said fuselage, a link having an inner end pivotally connected to said frame, a pivot pin pivotally mounted at the outer end of said link and having means on said wing section rotatably securing the pivot pin thereto for movement of the link in a vertical plane and swinging movement of the wing about the pivot pin in a substantially horizontal plane, pulling means operably attached to said fuselage and connected to said wing section at a point between said pivot pin and the trailing edge of said wing section nearer the wing tip than said pivot pin for pulling said wing section inwardly toward and above said fuselage and for swinging said wing section about said pivot pin to a position substantially parallel to said fuselage, said frame being swingably connected to said fuselage for movement about a substantially vertical axis toward and away from said fuselage, and means attached to said fuselage and operatively connected to and swinging said frame toward said wing section after said wing section has been moved to the position substantially parallel to said fuselage.

4. The combination of claim 2 wherein said pulling means consists of a drum mounted on said fuselage, a cable wound on said drum, one end of said cable being fastened to the inboard end of said wing, and the other end of said cable being connected to said wing section at said point between said pivot pin and said trailing edge.

5. In an aircraft having a fuselage, a wing section detachably connected at its inboard end to said fuselage, a frame connected to said fuselage, a link having an inner end pivotally connected to said frame, a pivot pin pivotally mounted at the outer end of said link and having means on said wing section rotatably securing the pivot pin thereto for movement of the link in a vertical plane and swinging movement of the wing about the pivot pin in a substantially horizontal plane, pulling means operably attached to said fuselage and connected to said wing section at a point between said pivot pin and the trailing edge of said wing section nearer the wing tip than said pivot pin for pulling said wing section inwardly toward and above said fuselage and for swinging said wing section about said pivot pin to a position substantially parallel to said fuselage, and overlying said fuselage, and rolling means on said wing section operatively contacting the top of the fuselage and the wing section to facilitate sliding the wing section on the fuselage top.

6. In an aircraft having a fuselage, a wing section detachably connected at its inboard end to said fuselage, a frame connected to said fuselage, a link having an inner end pivotally connected to said frame, a pivot pin pivotally mounted at the outer end of said link and having means on said wing section rotatably securing the pivot pin thereto for movement of the link in a vertical plane and swinging movement of the wing about the pivot pin in a substantially horizontal plane, pulling means operably attached to said fuselage and connected to said wing section at a point between said pivot pin and the trailing edge of said wing section nearer the wing tip than said pivot pin for pulling said wing section inwardly toward and above said fuselage and for swinging said wing section about said pivot pin to a position substantially parallel to said fuselage, a strut pivotally connected at one end to said frame, said wing section having a sliding connection thereon to which the other end of said strut is connected for movement of the strut to a position substantially parallel to the fuselage when the wing section is so moved.

7. In an aircraft having a fuselage, a wing section detachably connected at its inboard end to said fuselage, a frame connected to said fuselage, a link having an inner end pivotally connected to said frame, a pivot pin pivotally mounted at the outer end of said link and having means on said wing section rotatably securing the pivot pin thereto for movement of the link in a vertical plane and swinging movement of the wing about the pivot pin in a substantially horizontal plane, pulling means operably attached to said fuselage and connected to said wing section at a point between said pivot pin and the trailing edge of said wing section nearer the wing tip than said pivot pin for pulling said wing section inwardly toward and above said fuselage and for swinging said wing section about said pivot pin to a position substantially parallel to said fuselage, said frame being swingably connected to said fuselage for movement about a substantially vertical axis toward and away from said fuselage, and means attached to said fuselage and operatively connected to and swinging said frame toward said wing section after said wing section has been moved to the position substantially parallel to said fuselage, said means operatively connected to and rotating said frame, consisting of a screw rotatably mounted and longitudinally disposed on said fuselage, a follower on said frame operatively carried on said screw and moving said frame toward and away from said fuselage upon rotation of the screw.

JAMES WISMER HOLLAND.

References Cited in the file of this patent

UNITED STATES PATENTS

| Number | Name | Date |
| --- | --- | --- |
| 2,338,751 | Zuck | Jan. 11, 1944 |
| 2,544,021 | Holland | Mar. 6, 1951 |

FOREIGN PATENTS

| Number | Country | Date |
| --- | --- | --- |
| 373,980 | Great Britain | Nov. 28, 1930 |